Patented July 22, 1952

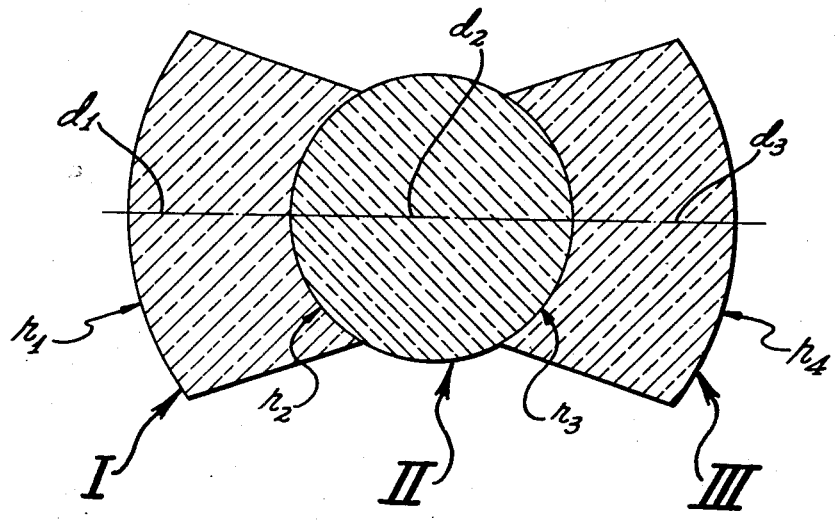

2,604,012

UNITED STATES PATENT OFFICE 2,604,012

SYMMETRICAL MONOCENTRIC ACHROMATIZED TRIPLET EYEPIECE LENS SYSTEM

Philip H. Taylor, Los Angeles, Calif., assignor to Northrop Aircraft, Inc., Hawthorne, Calif., a corporation of California Application April 17, 1951, Serial No. 221,465

1 Claim. (Cl. 88—57)

This invention relates to a high quality, symmetrical monocentric achromatized eyepiece, and more particularly to a means and method of achieving paraxial achromatization for monocentric lens systems.

Monocentric systems are useful for a variety of purposes. In particular, for eyepieces and for small objectives, especially one in which it is possible either to curve the object, or to tolerate a spherical field. It is further well known that lens systems can be rendered achromatic by employing elements of proper power ratio made of different types of glass. For example, in a simple doublet, a positive element of low index and high V number such as crown glass can be used in combination with a negative element of high index and low V number such as flint to provide achromatization when the ratio of powers of the positive crown element to the negative flint element is correctly determined.

The present invention has for an object to provide a high quality monocentric eyepiece wherein paraxial achromatization as well as good correction of the other aberrations is obtained.

It is a further object of the invention to provide a means and method wherein paraxial achromatization can be obtained very quickly for any combination of different glasses, as for example crown and flint in monocentric triplet combination.

Briefly, the foregoing objects and other objects ancillary thereto are preferably accomplished by providing a monocentric lens system comprising for example three elements used therein of different index and dispersion arranged in cemented triplet combination and which elements are of proper power ratio according to newly developed equations herein derived.

The invention possesses other objects and features, some of which, together with the foregoing, will be set forth in the following description of a preferred embodiment of the invention, and the invention will be more fully understood by reference to the accompanying drawing in which the single figure is a diagrammatic outline of the axial cross section of an eyepiece in accordance with this invention.

In an achromatized lens system it is first desired to join two extreme wavelengths of the spectrum, demanding that the system shall have a given focal length at a wavelength which is nearly the mean of the two extremes. These wavelengths can be designated by $v$, $r$, and $m$, where $v$ is the shortest wavelength or "nominal violet," $r$ is the longest or "nominal red" and $m$ is the mean or "nominal green."

Since the power of any monocentric lens is (see for example p. 455 of the standard textbook by A. E. Conrady: "Applied Optics and Optical Design," Oxford University Press, 1929), strictly, for paraxial rays, $$\frac{1}{f'} = \frac{N-1}{N}\left(\frac{1}{r_1} - \frac{1}{r_2}\right) \quad \text{Eq. 1}$$

where:

$f'$ is the focal length of the subject lens,
$N$ is the index of refraction of the subject lens,
$r_1$ is the radius of curvature of the first surface of the subject lens, and
$r_2$ is the radius of curvature of the second surface of the subject lens.

Writing Eq. 1 for the red and violet wavelengths which are to be joined in a two-glass combination and henceforth writing as definition, $$c_a = \left(\frac{1}{r_1} - \frac{1}{r_2}\right)_a \text{ and } c_b = \left(\frac{1}{r_1} - \frac{1}{r_2}\right)_b$$

where the subscripts $a$ and $b$ refer to the crown and flint components, respectively, the summing of the powers for each wavelength yields;

$$\frac{1}{f'_r} = c_a\left(\frac{N_r-1}{N_r}\right)_a + c_b\left(\frac{N_r-1}{N_r}\right)_b \quad \text{Eq. 2a}$$

$$\frac{1}{f'_v} = c_a\left(\frac{N_v-1}{N_v}\right)_a + c_b\left(\frac{N_v-1}{N_v}\right)_b \quad \text{Eq. 2b}$$

The subscripts $v$ and $r$ refer to values for the shortest ("nominal violet") and longest ("nominal red") wavelengths, respectively.

Now the condition of achromatism demands that the red and violet focal lengths must be identical or, symbolically, $$\frac{1}{f'_r} = \frac{1}{f'_v}$$

Subtraction of Eq. 2a and from Eq. 2b yields, $$c_a\left(\frac{N_v-N_r}{N_v N_r}\right)_a + c_b\left(\frac{N_v-N_r}{N_v N_r}\right)_b = 0 \quad \text{Eq. 3a}$$

The focal length of the combination is, from Eq. 1, $$c_a\left(\frac{N_m-1}{N_m}\right)_a + c_b\left(\frac{N_m-1}{N_m}\right)_b = \frac{1}{f'} \quad \text{Eq. 3b}$$

where the subscript $m$ refers to the mean or "nominal green" wavelength.

Next, the designer's prerogative of working with a focal length of unity is adopted. But to simplify the notation, first define;

$$P_a = \left(\frac{N_v-N_r}{N_v N_r}\right)_a, \quad Q_a = \left(\frac{N_m-1}{N_m}\right)_a$$

$$P_b = \left(\frac{N_v-N_r}{N_v N_r}\right)_b, \quad Q_b = \left(\frac{N_m-1}{N_m}\right)_b$$

Eq. 3a and Eq. 3b then become, $$c_a P_a + c_b P_b = 0 \quad \text{Eq. 4a}$$
$$c_a Q_a + c_b Q_b = 1 \quad \text{Eq. 4b}$$

The solution of which is, $$c_a = \frac{P_b}{P_a Q_b - P_b Q_a} \quad \text{Eq. 5a}$$

$$c_b = \frac{P_a}{P_a Q_b - P_b Q_a} \quad \text{Eq. 5b}$$

The best form for such a lens would be that of a cemented triplet wherein a positive crown glass element is flanked by two negative menisci of flint glass. The only "bending" possible to control spherical aberration will be that of shifting the relative powers between the fore and aft fline components. If the choice of glasses is a good one, such bending can quickly correct for spherical aberration in the small diameter bundles of eyepieces.

For an eyepiece of one inch focal length, made from a borosilicate crown type (BSC-2) and a dense flint type (DF-3) glass, and to work at $f/10$ (semi-diameter of exit pupil equal to 0.050 inch), the following data are available from the standard manufacturer's glass property tables:

| Index and Dispersion Factor | Type of Glass | |
|---|---|---|
| | BSC-2 | DF-3 |
| $N_C$ (C line index, $=N_r$) | 1.51462 | 1.61611 |
| $N_D$ (D line index) | 1.51700 | 1.62100 |
| $N_F$ (F line index, $=N_v$) | 1.52264 | 1.63327 |
| $V$ (reciprocal of dispersion) | 64.5 | 36.2 |

$N_y(=N_m)$, the index for "brightest light" for visual instruments is given by the relation, $$N_y = N_D + 0.188(N_F - N_C)$$

(see Conrady, A. E., loc., cit., p. 210).

The following numerical data can be obtained from the above. The data relate to terms, heretofore defined, for Eq. 5a and Eq. 5b.

| | (a) | (b) |
|---|---|---|
| $N_y =$ | 1.51851 | 1.62423 |
| $N_F - N_C =$ | .00802 | .01716 |
| $N_F \cdot N_C =$ | 2.30622 | 2.63954 |
| $P_a =$ | .003477 | |
| $P_b =$ | | .006501 |
| $N_y - 1 =$ | .51851 | .62423 |
| $Q_a =$ | .34146 | |
| $Q_b =$ | | .38432 |
| $P_a \cdot Q_b =$ | .001336 | |
| $P_b \cdot Q_a =$ | .002220 | |
| $P_a Q_b - P_b Q_a =$ | $-.000884$ | |
| $c_a =$ | 7.35407 | |
| $c_b =$ | | $-3.93326$ |

The entire system is first made symmetrical. For the crown, $$c_a = \left(\frac{1}{r_1} - \frac{1}{r_2}\right)_a = 7.35407$$

Since $r_1 = -r_2$ for the crown, $$\frac{2}{r_a} = 7.340407 \text{ or } r_a = .2720$$

where $r_a$ is the radius of curvature for the crown element. For the left of the identical flint element, $r_2 = .2720$ (cemented to crown)

and $$\frac{1}{2} c_b = \left(\frac{1}{r_1} - \frac{1}{r_2}\right)_b = \frac{-3.93326}{2} = -1.96663$$

since the identical flint elements divide equally the power.

Thus, $$\frac{1}{r_1} - \frac{1}{.2720} = -1.96663$$

$$\frac{1}{r_1} = 1.70984$$

and $$r_1 = .5848$$

This gives the prescription,

| Radii and Thickness | Type of Glass | Lens |
|---|---|---|
| $r_1 = .5848$ | | |
| $d_1 = .3128$ | DF-3 | I |
| $r_2 = .2720$ | | |
| $d_2 = .5440$ | BSC-2 | II |
| $r_3 = -.2720$ | | |
| $d_3 = .3128$ | DF-3 | III |
| $r_4 = -.5848$ | | | wherein the figure of the accompanying drawing illustrates an eyepiece in accordance with the given data and with the present invention. In the drawing, the radii of the three lenses have been indicated as $r_1$, $r_2$, $r_3$ and $r_4$. Lenses I and III of axial thickness $d_1$ and $d_3$, respectively, are cemented to lens II of thickness $d_2$ along $r_2$ and $r_3$.

A test of focal length and paraxial achromatism by the strict trigonometrical method give the following results:

$$f' = 1.0008$$
$$l' = .4160$$

$$LA' = .0013 \pm .0352 \text{ (Empirical}$$
$$lc' - l_F' = -.0004 \pm .0088 \text{ Tolerance)}$$

wherein, $f'$ is the focal length of the eyepiece, $l'$ is the distance from the vertex of the last surface to the focus, $LA'$ is a measure of the longitudinal spherical aberration, and $lc' - l_F'$ is a measure of the longitudinal chromatic abberation.

Data from the traces is illuminating with regard to monocentric systems; the angles of incidence and of refraction are alike in pairs, exactly in the paraxial region and nearly at the margin. That is, in the subject eyepiece, $$i_1 = -i_4', \; i_1' = -i_4, \; i_2 = -i_2' = -i_3$$

where, $i$ is the angle of a ray trace from the normal to a refracting surface, the primes indicate the angle made with the normal after passing the particular surface and the numerical subscripts refer to the different surfaces. It follows that all monocentric achromatic lenses are free from lateral color.

The solutions obtained by use of the "thin" chromatic equations (designated TL Chr (4) by Conrady, A.E., loc., cit., p. 148), so useful in the design of telescopes objectives and simple microscope objectives give the results, $$c_a = 4.405 \text{ and } c_b = -2.059$$

a result which is incorrect by 40% in the absolute value of the powers, and by 14% in the ratio of the powers, crown to flint.

Thus, equations have been developed which are chromatically exact in the paraxial region for the design of any two-glass monocentric combination. A three component symmetrical eyepiece was derived using these analytical expressions and checked by precise trigonometrical ray traces. The residual spherical aberration of the subject lens was vanishingly small and the longitudinal chromatic aberration was similarly well within empirical tolerance. The lens is free from lateral color.

A principal advantage of the monocentric eyepiece is that it has but two air-to-glass surfaces. It has, however, a relatively small field.

While in order to comply with the statute, the invention has been described in language more or less specific as to structural features, it is to be understood that the invention is not limited to the specific features shown, but that the means and construction herein disclosed comprise the preferred form of several modes of putting the invention into effect and the invention is, therefore, claimed in any of its forms or modifications within the legitimate and valid scope of the appended claim.

What is claimed is:

A symmetrical monocentric achromatized lens system for use as an eyepiece or small objective comprising three closely packed lenses, the first and third components consisting of identical negative concave-convex lenses of high index and low V number glass, said first and third components being cemented along concave surface in axial alignment to convex surfaces of the second component, said second component consisting of a positive bi-convex lens of low index and high V number glass, said lens system being well corrected for spherical and chromatic aberrations, and having numerical data substantially as set forth in the following table, wherein $r$ designates the radius of curvature of the individual surfaces, $d$ designates the axial thickness of the individual elements:

| Radius and Thickness | Type of Glass | Lens |
|---|---|---|
| $r_1 = .5848$ <br> $d_1 = .3128$ | Dense Flint, DF-3 | I |
| $r_2 = .2720$ <br> $d_2 = .5440$ | Borosilicate Crown, BSC-2 | II |
| $r_3 = -.2720$ <br> $d_3 = .3128$ <br> $r_4 = -.5848$ | Dense Flint, DF-3 | III | said glasses having the following characteristics:

| Index and Dispersion Factor | Type of Glass | |
|---|---|---|
|  | BSC-2 | DF-3 |
| $N_C$ (C line index, $= N_r$) | 1.51462 | 1.61611 |
| $N_D$ (D line index) | 1.51700 | 1.62100 |
| $N_F$ (F line index, $= N_v$) | 1.52264 | 1.63327 |
| V (reciprocal of dispersion) | 64.5 | 36.2 |

PHILIP H. TAYLOR.

REFERENCES CITED

The following references are of record in the file of this patent:

UNITED STATES PATENTS

| Number | Name | Date |
|---|---|---|
| 415,040 | Hastings | Nov. 12, 1889 |
| 535,897 | Goerz et al. | Mar. 19, 1895 |
| 886,416 | Rudolph | May 5, 1908 |
| 1,025,766 | Straubel | May 7, 1912 |
| 1,293,086 | Graf | Feb. 4, 1919 |
| 2,410,069 | Holman | Oct. 29, 1946 |
| 2,522,390 | McCarthy | Sept. 12, 1950 |
| 2,538,291 | Bouwers | Jan. 16, 1951 |

FOREIGN PATENTS

| Number | Country | Date |
|---|---|---|
| 2,193 | Great Britain | of 1859 |